(12) United States Patent
La Roche et al.

(10) Patent No.: US 6,431,499 B1
(45) Date of Patent: Aug. 13, 2002

(54) WING COMPRISING A DISTAL WING GRID

(75) Inventors: Ulrich La Roche, Heilighüsli 18, Zürich (CH), 8053; Lucas La Roche, Zürich (CH)

(73) Assignee: Ulrich La Roche, Zurich (CH)

( * ) Notice: Subject to any disclaimer, the term of this patent is extended or adjusted under 35 U.S.C. 154(b) by 0 days.

(21) Appl. No.: 09/976,696

(22) Filed: Oct. 12, 2001

(30) Foreign Application Priority Data

Nov. 10, 2000 (CH) .............................................. 2191/00

(51) Int. Cl.$^7$ ................................................ B64C 3/00
(52) U.S. Cl. ....................... 244/198; 244/199; 244/45 R
(58) Field of Search ............................... 244/198, 199, 244/45 R, 48

(56) References Cited

U.S. PATENT DOCUMENTS

| | | | | |
|---|---|---|---|---|
| 2,743,888 A | * | 5/1956 | Lippisch | 244/130 |
| 4,595,160 A | * | 6/1986 | Santos | 244/199 |
| 4,671,473 A | * | 6/1987 | Goodson | 244/199 |
| 5,312,070 A | * | 5/1994 | Arena | 244/218 |
| 5,634,613 A | * | 6/1997 | McCarthy | 244/130 |
| 5,823,480 A | | 10/1998 | La Roche | 244/199 |
| 6,345,790 B1 | * | 2/2002 | Brix | 244/199 |

* cited by examiner

*Primary Examiner*—J. Woodrow Eldred
(74) *Attorney, Agent, or Firm*—Rankin, Hill, Porter & Clark LLP

(57) ABSTRACT

In a wing with a main wing part (1) and a drag-reducing wing grid arranged at a distal end of the main wing part, a grid includes at least two winglets (2) staggered in parallel and with an overlap (c/t) smaller than one. A zero air flow direction of the winglets (2) is, on average, matched to the zero air flow direction of the main wing part (1) and the ratio of the length of the chord ($c_M$) of the main wing part (1) to the chord length ($c_W$) of the wing grid is essentially the same as the correction factor Kappa according to Betz applicable for the overlap of the winglets. For this wing, the lift of the main wing part (1) and the wing grid is not only equal in the design point, but also the lift gradients of the main wing part (1) and of the wing grid are coincident. This means that the drag-reducing effect of the wing grid is maintained independent of the momentary angle of attack of the wing, without the wing grid having to be adjusted accordingly.

24 Claims, 5 Drawing Sheets

WING COMPRISING A DISTAL WING GRID

BACKGROUND OF THE INVENTION

The invention relates to a wing having a main wing part with a surface being circumflown in a closed manner and a wing grid arranged on a distal end of the main wing part. The wing preferably is the wing of an aerodynamic vehicle. The wing can, however, also be the wing of a propeller, the sail of a boat or the centerboard of a boat.

From the publications EP-0642440 and U.S. Pat. No. 5,823,480 of the same applicant, it is known to design the distal section of a wing as a wing grid comprising at least two winglets staggered in parallel in order to significantly reduce the induced drag of the complete wing as compared to a wing of the same wing span, but without a wing grid, or in order to achieve the same lift/drag ratio compared with a wing without wing grid and with a significantly greater wing span.

According to the above-mentioned publications, the following conditions must be fulfilled by the wing grid for the design point in order to achieve the named drag-reducing effect:

The lift per length unit of wing span (span load) is the same for the wing grid as for the main part of the wing (at least in the area in which the grid is attached to the main wing part; for a rectangular distribution of the lift if at all possible over the whole wing span) and the air flow around the main wing is taken over by the winglets of the wing grid along the chord section by section;

the winglets of the wing grid are staggered e.g. from the rear bottom to the front top, wherein the stagger angle (angle between the chord of the main wing part and the chord of the wing grid) is at least as great as the angle of attack of the main wing at the design point;

The winglets of the wing grid have an overlap, which is less than 1 (overlap=ratio between the winglet chord and the grid spacing).

If the conditions as mentioned above are fulfilled, the vortex discs coming away from the winglets of the grid flow off separately, such effecting the drag-reduction.

For a wing with a wing tip designed as a wing grid, for which the conditions mentioned above are fulfilled, the drag-reducing effect is a maximum in the design point. If this maximum effect is to be achieved for another angle of attack or for a different speed respectively, then the grid has to be correspondingly adjusted, for example by correspondingly adjusting the angle of attack of the individual winglets or by changing the chord lengths of the winglets. In the publications mentioned above, it is recommended for an adjustment of the angle of attack to have the wing grid to follow as a whole, wherein the grid parameters remain unchanged.

If, for the purpose of reducing the induced drag, a wing with a sweep as utilised for high sub-sonic speeds is equipped with a wing grid at its tip, then according to the above-mentioned publications the sweep not only of the main wing but also of the wing grid needs to be adapted to a predefined Mach number in function of the angle of attack and of the profile thickness. This may result in different sweep angles for the main wing and for the wing grid. It shows that a wing grid which is designed for an equal sweep angle produces a lift differing from that of the main wing and, therefore, usually has a smaller drag-reducing effect when used with a sweep angle that is different from the sweep angle of the main wing unless it is correspondingly modified or correspondingly adjusted.

SUMMARY OF THE INVENTION

It is an object of the invention to create a wing with a main wing part and a drag-reducing wing grid arranged at the distal end of the main wing part, for which wing the drag-reducing effect of the wing grid is fully maintained with changing angle of attack without the wing grid having to be adjusted or made to follow.

For achieving this object, the main wing part and wing grid of the wing according to the invention have to fulfil the above mentioned conditions regarding overlap and stagger angle as well as the condition of producing the same lift (CL) in the design point. In addition, the main wing part and the wing grid also have to be designed to have an essentially equal lift gradient ($\delta CL/\delta\alpha$ or lift change per change of the angle of attack $\alpha$).

It can be shown, that the conditions mentioned with respect to lift and lift gradient can be simultaneously fulfilled, if the average zero air flow direction of the winglets of the wing grid is essentially the same as the zero air flow direction of the main wing and if the chord length of the grid is adapted to the chord length of the main wing part in function of the overlap of the winglets such that the ratio of the chord length of the main wing part to the chord length of the grid in essence is the same as the correction factor Kappa according to Betz applicable for the average overlap of the winglets (refer to FIG. 3).

To be understood by coincidence of the zero air flow direction of main wing part and wing grid is the fact that the grid is to be arranged on the main wing such that, in case of an incidence of the main wing part relative to an air flow, no lift results (zero angle of attack), the grid does not produce a lift. To be understood by chord length of the grid, is the distance between the front edge of the foremost winglet in the direction of the air flow to the rear edge of the rearmost winglet in the direction of the air flow. The average overlap is the ratio of the average chord length of the winglets and the average grid spacing.

For a wing, the main wing part and wing grid of which fulfil the above-mentioned conditions, the lift for the main wing part and for the wing grid is always the same independent of the angle of attack. This also signifies that the wing grid maintains its drag-reduction effect independent of the angle of attack. This can be attributed to the fact that both wing parts have the same deflection characteristics, as a result of which upon a change of the angle of attack, the lift changes by the same amount for the main wing part and for the wing grid (same lift gradient).

The statement of the previous paragraph is exactly true only for a case in which the wing grid does not have any lift-dependent twisting effect on the main wing.

For adapting a drag-reducing wing grid with at least two winglets and an overlap <1 to a predefined main wing part with a predefined profile and, therefore, a predefined lift and a predefined lift gradient, the cross-section of the wing grid is enlarged affinely such that the chord length of the grid is adapted to the chord length of the main wing part in the manner mentioned above. This adapted grid is arranged on the main wing part such that the stagger angle is greater than the angle of attack of the main wing part in the design point and the angle of attack of the winglets is adapted for the coincidence of the zero air flow of main wing part and wing grid.

In order to avoid twisting of the wing part by the wing grid, the grid furthermore is advantageously arranged on the main wing part such that its center of lift is located on the elastic torsion axis of the main wing part. This is achieved by correspondingly positioning the wing grid on the main wing. If so required, the position of the center of lift of the grid can also be adjusted for a predefined grid position on the main wing part, by adapting the lift distribution in the grid correspondingly or by sweeping the grid (only for Mach numbers below 0.5).

It can be shown that the adaptation of the drag-reducing grid located at the tip of a wing in accordance with the invention to different Mach numbers or to different sweep angle differences between main wing part and wing grid can be realized by means of a simple affine size change of the grid cross section. In doing so, the cross section of the wing grid, while maintaining the relevant grid parameters, is dimensioned such that the ratio of the chord length of the main wing part to the chord length of the wing grid is corrected by the inverse ratio of the cosine of the two sweep angles, this in addition to the above mentioned adaptation based on the deflection characteristics. For a wing in accordance with the invention, which is swept back, therefore the ratio of the chord length of the main wing part to the chord length of the wing grid corresponds to the above mentioned correction factor Kappa according to Betz multiplied with the inverse ratio of the cosines of the sweep angles.

For a wing according to the invention without sweep, therefore, for the ratio of the chord lengths of the main wing part and wing grid, the following is applicable:

$c_M/c_W$=Kappa (c/t)

For a wing according to the invention with sweep:

$c_M/c_W$=Kappa (c/t) x cos $\phi_W$/cos $\phi_M$ wherein:
$c_M$=chord length of the main wing part,
$c_W$=chord length of the wing grid (distance from the front edge of the foremost winglet to the back edge of the rearmost winglet),
Kappa=correction factor according to Betz, dependent on overlap and deflection angle,
c=chord length of the winglets
t=grid spacing
c/t=overlap
cos $\phi_M$=cosine of sweep angle of main wing part,
cos $\phi_W$=cosine of sweep angle of grid.

The ratio of the chord length of the main wing part to the chord length of the wing grid advantageously deviates from the values demanded in the previous paragraphs by less than 10%. The coincidence of the zero airflow direction is advantageously better than 2°.

BRIEF DESCRIPTION OF THE DRAWINGS

The wing according to the invention with drag-reducing wing grid located at the tip is described in more detail on the basis of the following Figures, wherein.

DETAILED DESCRIPTION OF THE PREFERRED EMBODIMENT

Figure 1:
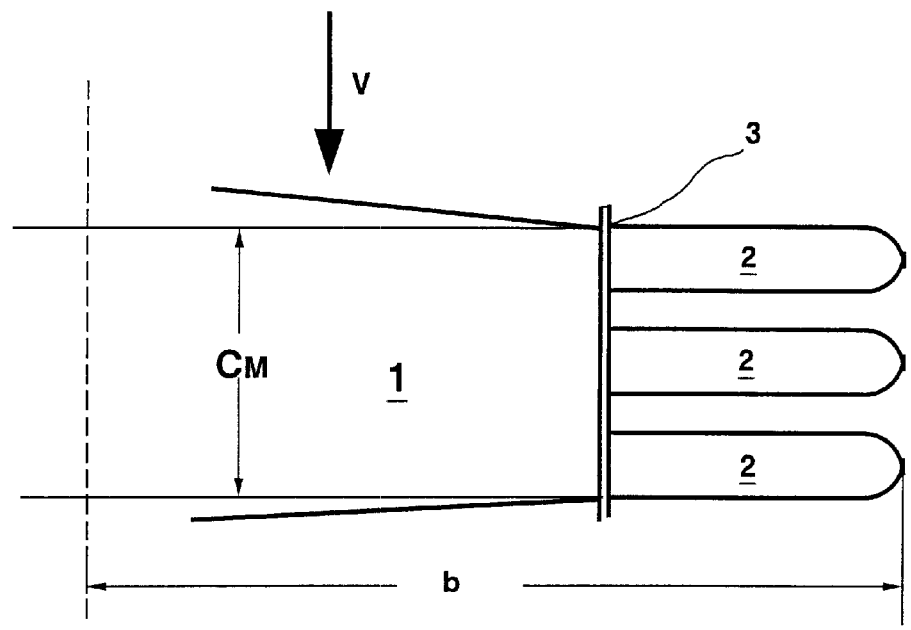
FIG. 1 shows an example of a wing with a main wing part and drag-reducing wing grid located at the wing tip (state of the art)
Figure 2:
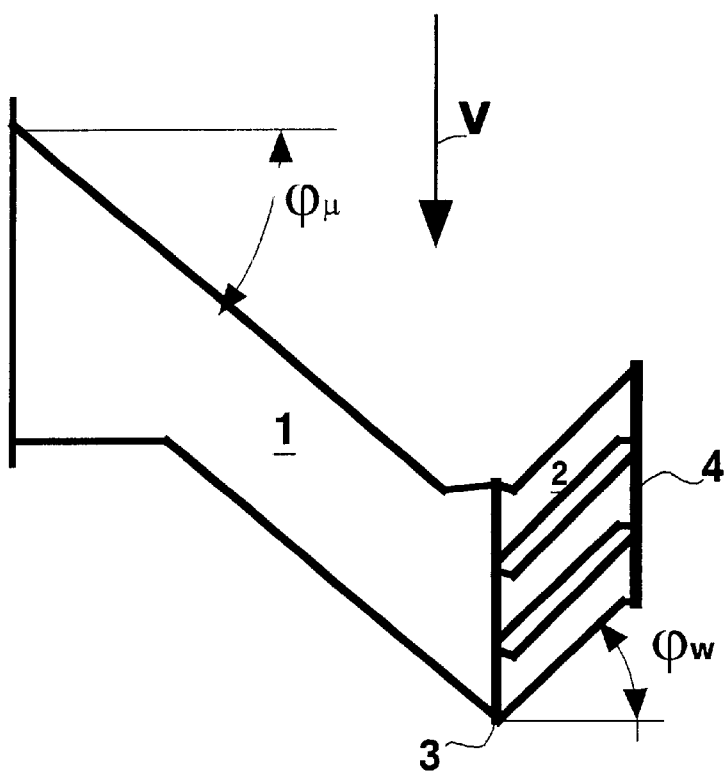
FIG. 2 shows an example of a swept wing with main wing part and drag-reducing wing grid located at the wing tip, main wing part and grid for the individual adaptation to a predefined Mach number having different sweep angles (state of the art)

FIGS. 1 and 2 depict, from a bird's eye view, two wings in accordance with the publications mentioned at the beginning. These comprise a main wing part 1 and a drag reducing wing grid located at the distal end of the wing, the grid having at least two winglets 2 (FIG. 1: three winglets, FIG. 2: three winglets) arranged staggered in parallel. The wing span of the main wing part 1 is greater than the wing span of the wing grid. The main wing part 1 comprises at its distal end a wall or intermediate plate 3 arranged in the plane of the airflow direction v. The winglets 2 are mounted on this intermediate plate 3. If so required, the distal ends of the winglets 2 are held in a holding frame or end plate 4 (FIG. 2). The main wing part 1 has a chord length $c_M$ at its distal end.

The wing illustrated in FIG. 1 is not swept back. The wing depicted in FIG. 2 is swept back, whereby for the individual adaptation of the main wing part 1 and the wing grid to a specific Mach number, the main wing part 1 has a sweep angle $\phi_M$ and the winglets 2 of the grid have a sweep angle $\phi_W$ differing from the sweep angle $\phi_M$. The wing as illustrated is designed for a Mach number of 0.9. The critical Mach number for the main wing part is 0.7 and for the grid 0.65. The wing span of the grid amounts to approximately 20% of the overall wing span. The sweep angle $\phi_M$ of the main wing part 1 is positive and amounts to approximately 40°, the sweep angle $\phi_W$ of the winglets 2 of the grid is negative and amounts to approximately 42°. In the example, a negative sweep angle has been selected for the wing grid, in order to displace the center of lift forwards and with this to compensate for the effect of a rectangular lift distribution on the position of the center of lift (displacement forwards of the center of lift of the whole wing system).

Figure 3:
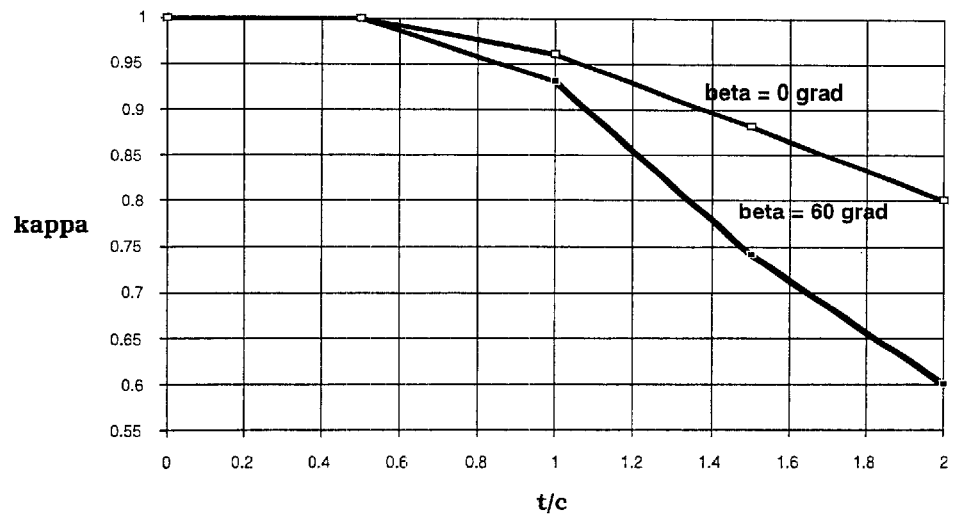
FIG. 3 shows the correction factor Kappa according to Betz as a function of the overlap of the winglets of an open wing grid with a small overlap.

FIG. 3 depicts the correction factor, e.g. according to A. Betz (collaborator of L. Prandtl, refer to Ing. Archiv [Eng. Archive], 1932, page 357), for wing grids with a small overlap as a function of the reciprocal value (t/c) of the overlap (c/t) of the winglets and of the deflection angle β (beta), wherein the overlap is the ratio of the chord length c of the winglets to the grid spacing t (for c and t, refer to FIG. 4). The diagram is published in: Hütte, Des Ing. Taschenbuch [The Engineer's Handbook], 28th edition, page 808, FIG. 92.

From the diagram of FIG. 3, it is evident that the correction factor according to Betz decreases with decreasing overlap c/t and increasing deflection angle β.

Figure 4:
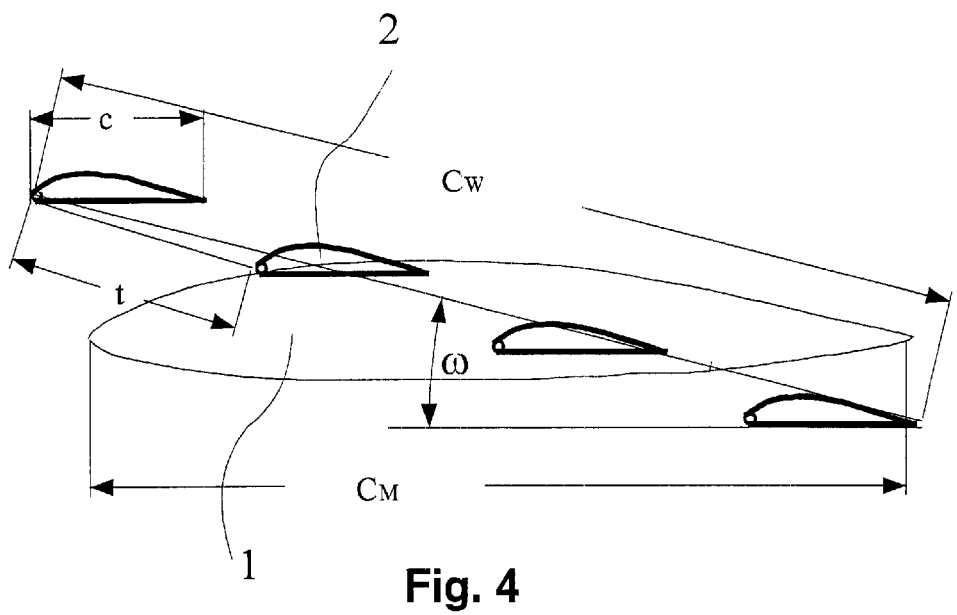
FIGS. 4 to 8 show cross sections through the main wing part and wing grid of five exemplary embodiments of the wing in accordance with the invention; and, FIGS. 9 and 10 show further measures for reducing the drag of the wing according to the invention.

FIG. 4 illustrates, in a section parallel to the wing chords, the main wing part 1 and the four winglets 2 of the drag-reducing grid at the wing tip of an exemplary embodiment of the wing in accordance with the invention. In the figure, c designates the chord length of the winglets and t the grid spacing, and the values for c and t are selected such that c/t (overlap) is smaller than 1. For the wing according to the invention it is not a condition that all winglets have the same chord lengths c and that the grid spacing is regular. For irregular grids, the mentioned conditions are applicable for the average values of c and t.

The chord $C_M$ of the main wing part 1 is smaller than the chord cw of the grid by the correction factor according to Betz. The stagger angle ω, i.e., the angle between the chord $c_M$ of the main wing part 1 and the chord $c_W$ of the grid, is greater than the angle of attack of the main wing 1 in the point of design. If the main wing part 1 and the winglets 2 of the grid have the same zero angle of attack, then the winglet chords c on average are parallel to the chord $c_M$ of the main wing part.

In a regular wing grid, as is illustrated in FIG. 4, the lift of the foremost winglet is the greatest, the lift of the rearmost winglet the smallest. It is advantageous to uniformly distribute the lift over the winglets, for example, by the winglets having different angles of attack (increasing from front to back, refer to FIG. 6). On the other hand, the grid with equal angles of attack of the winglets has the advantage that the position of its center of lift is not dependent on the speed and therefore can be arranged on the torsion axis of the main wing part independent of the speed.

Figure 5:
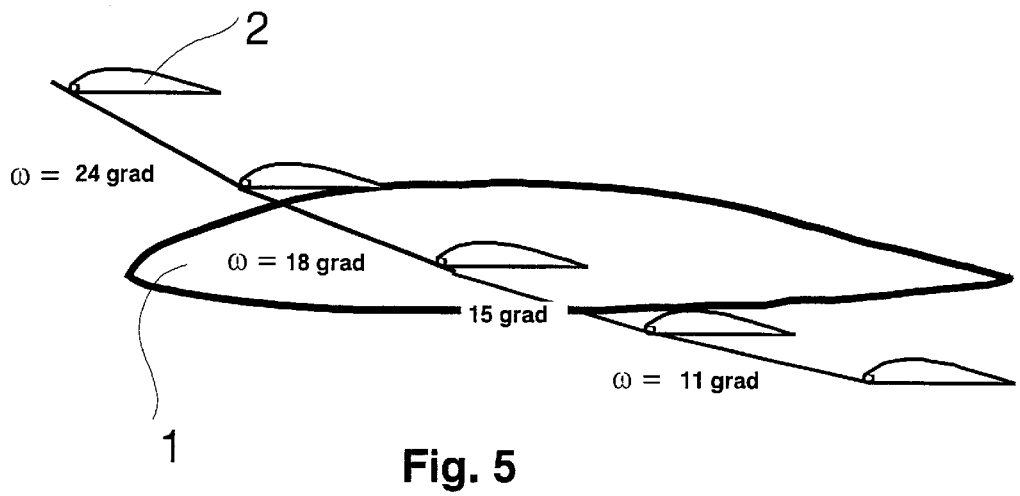

FIG. 5 shows, in the same mode of representation as FIG. 4, a further, exemplary embodiment of the wing in accordance with the invention. In this wing, the distribution of the lift over the individual winglets 2 is taken into account by a stagger angle ω increasing from back to front, wherein the individual stagger angle has to be greater than the respectively active angle of attack of the corresponding winglet.

Figure 6:
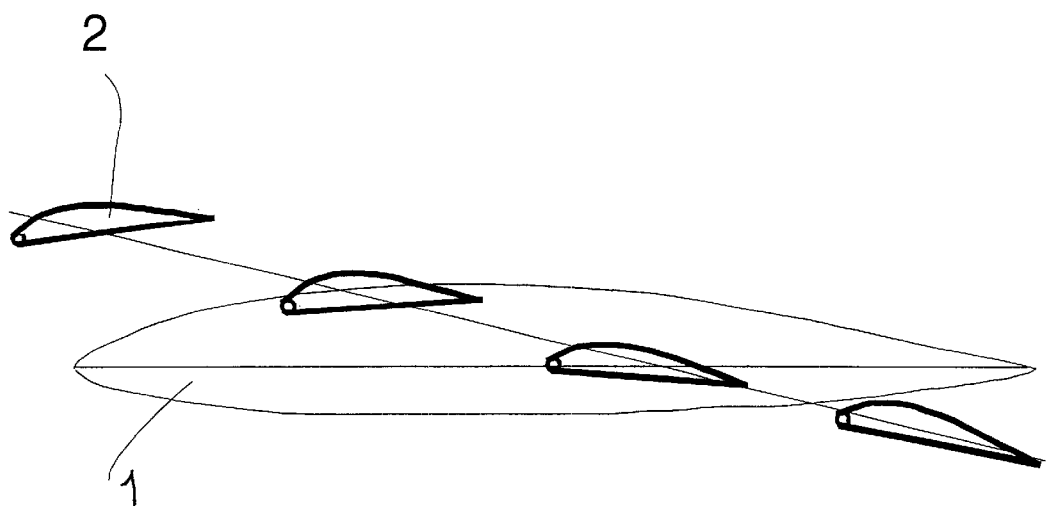

FIG. 6 shows, in the same mode of representation as FIG. 4, a further, exemplary embodiment of the wing in accordance with the invention. In this wing the distribution of the lift over the individual winglets 2 is taken into account by different angles of attack of the winglets. The angle of attack of the foremost winglet is smaller than the angle of attack of the rearmost winglet. The center winglets have average angles of attack. The angles of attack of the winglets are such that the zero air flow direction of the grid corresponds with the zero air flow direction of the main wing part 1.

The wing grid as depicted in FIG. 6 has a center of lift, the position of which is dependent on speed; with increasing speed, it moves backwards. If therefore, the center of lift of this wing grid for a normal speed is positioned on the torsion axis of the main wing part, then the wing in case of significantly higher speeds is nonetheless twisted through the effect of the grid in such a manner that the lift decreases, which, however, may well be desirable.

Figure 7:
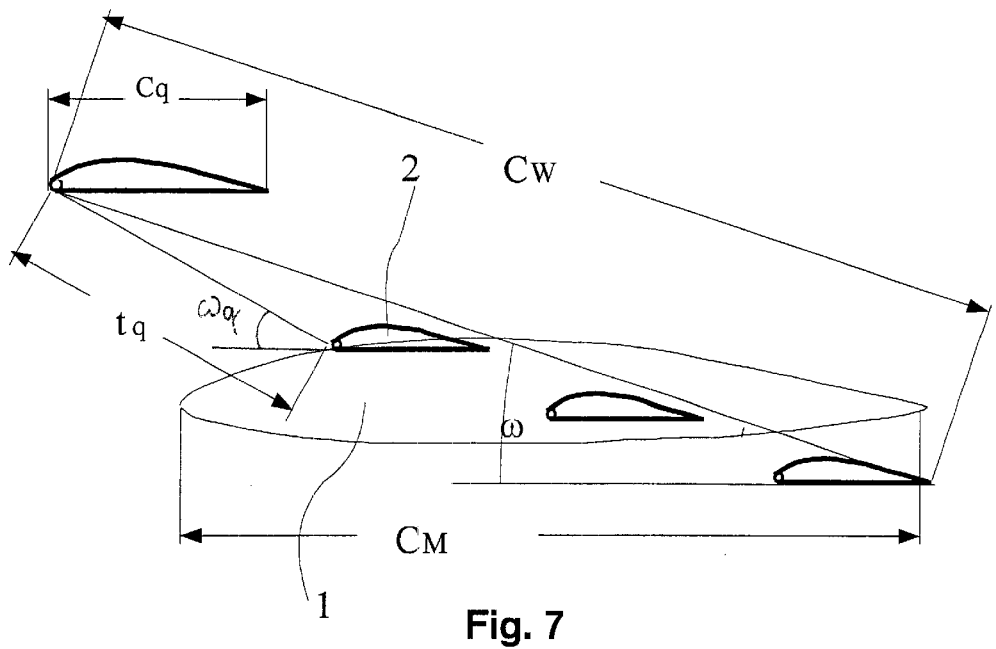
Figure 8:
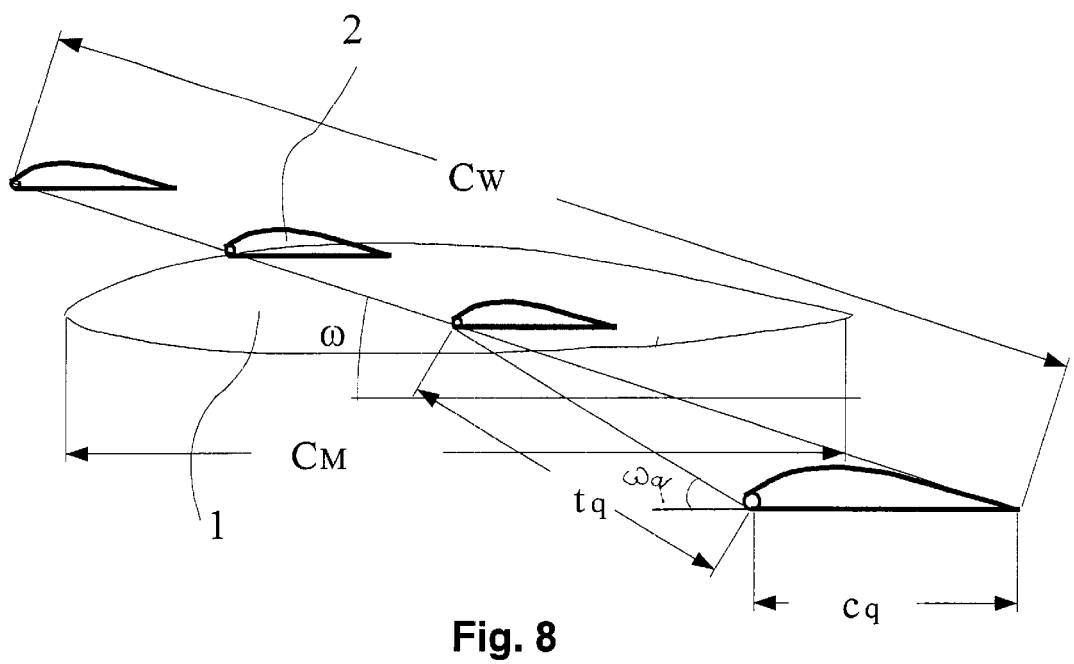

FIGS. 7 and 8 illustrate two further embodiments of the wing according to the invention in the same mode of representation as in the FIGS. 4 to 6, wherein the foremost winglet of the grid (FIG. 7) or the rearmost winglet of the grid (FIG. 8) is arranged at the main wing part 1 in such a manner, that its angle of attack is changeable in flight and the corresponding winglet therefore can take over the function of an aileron. For example, the angle of attack of the winglet is set by rotating it around its axis and/or by means of an arching flap, which is a part of the winglet profile.

In order to assure a full aileron effect of the corresponding winglet while maintaining the full drag-reducing effect of the grid, two measures are implemented. The chord length $c_Q$ of the winglet serving as aileron and the grid spacing $t_Q$ assigned to it are greater than the chord length and grid spacing of the remaining winglets, as a result of which the corresponding winglet can produce more lift. In addition, the individual stagger angle $\omega_Q$ of the aileron winglet is large enough for it to fulfil the condition for drag-reduction even at maximum deflection of the winglet. In the practical implementation, this signifies an additional increase of the individual stagger angle by at least 50% to 100% compared with the stagger angle utilised without any aileron function.

For the determination of the average zero air flow direction, the winglet utilised as an aileron is considered in its neutral position.

Figure 9:
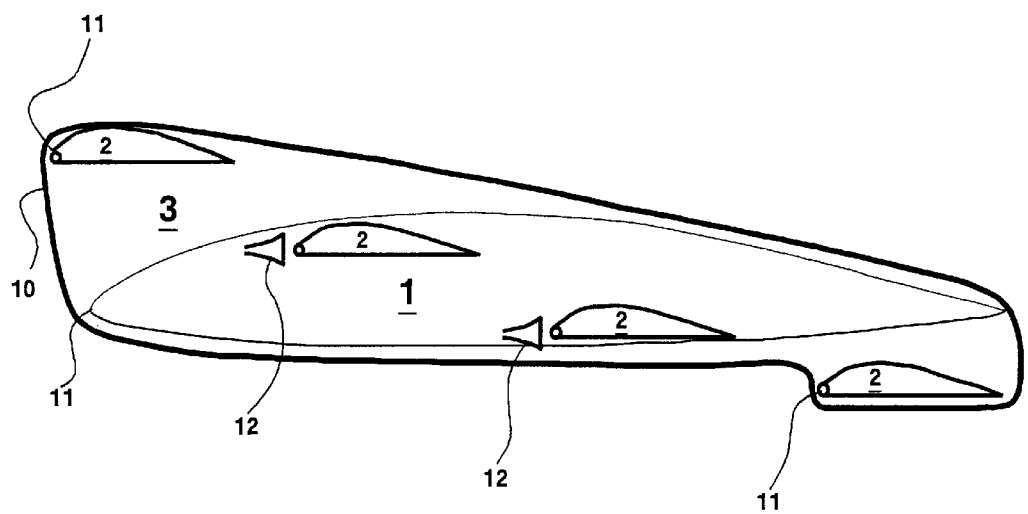
Figure 10:
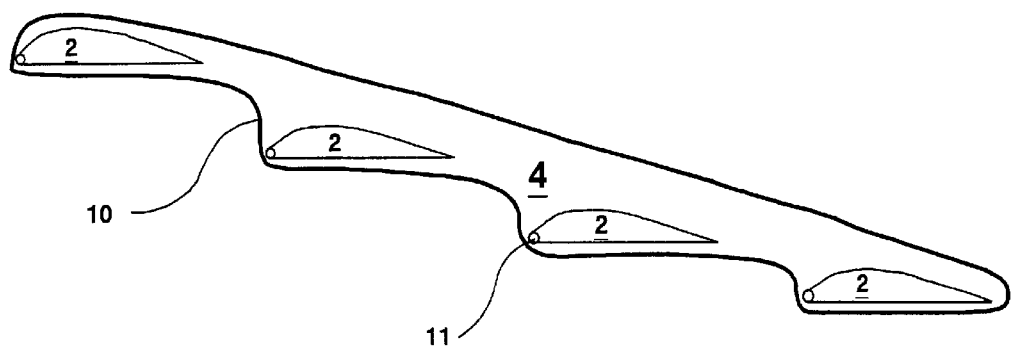

FIGS. 9 and 10 illustrate further measures, which contribute to further drag reduction of the wing in accordance with the invention and which regard in particular the plates delimiting the wing grid. These plates are also depicted in FIGS. 1 and 2 (intermediate plate 3 and end plate 4).

With these measures it is taken care that the reduction of the induced drag being achieved by the wing grid of the wing according to the invention, in contrast to known wings, is not partially or completely compensated by the interference drag being caused by these plates.

FIG. 9 depicts an intermediate plate 3 with the profile cross sections of the main wing part 1 and of the five winglets 2 of a wing grid. The intermediate plate 3 is shaped such that its leading edge 10 protrudes as little as possible beyond the nose zones 11 of the wing profiles. With this, it is assured that the boundary layer on the surface of the plate is thin in the nose region 11 of the profiles. For the winglets 2, which are positioned in the zone of the main wing part 1, such measure is not possible. For reducing the plate boundary layer in the nose zone of these winglets, it is advantageous to install suction extractors 12, for example, as such known NACA—inlets, in the plate 3 in the area of the nose zone 11 of the profiles.

FIG. 10 illustrates an end plate 4 for the wing grid also depicted in FIG. 9. The leading edge 10 of this end plate 4 runs essentially flush with all nose zones 11 of the profiles of the winglets 2 of the wing grid.

What is claimed is:

1. A wing comprising a main wing part (1) with a closed air flow around it and a drag-reducing wing grid arranged at a distal end of the main wing part (1) and comprising at least two winglets staggered in parallel (2), wherein an average overlap (c/t) of the winglets (2) is smaller than one, wherein an average stagger angle (ω) of the winglets is greater than an angle of attack of the main wing part (1) in a design point, wherein the winglets (2) are oriented such that a zero air flow direction to the winglets, on average, substantially coincides with a zero air flow direction to the main wing part (1), and wherein a ratio of a chord length ($c_M$) of the main wing part (1) at its distal end to a chord length ($c_W$) of the wing grid is essentially of a same value as a correction factor Kappa according to Betz for the average overlap (c/t) of the winglets.

2. The wing in accordance with claim 1, wherein the main wing part (1) has a first sweep angle ($\phi_M$) and the winglets (2) have a second sweep angle ($\phi_W$) differing from the first sweep angle ($\phi_M$) and wherein the ratio of the chord length ($c_M$) of the main wing (1) at its distal end to the chord length ($c_W$) of the wing grid is essentially of the same value as the correction factor Kappa according to Betz applicable for the overlap (c/t) of the winglets (2) multiplied with a ratio of the cosine of the second sweep angle ($\phi_W$) to a cosine of the first sweep angle ($\phi_M$).

3. The wing according to claim 1, wherein the wing grid is arranged on the main wing part (1) such that a center of lift of the wing grid is positioned on an elastic torsion axis of the main wing part (1).

4. The wing according to claim 1, wherein deviations of the ratio of the two chord lengths ($c_M$, $c_W$) from said value amounts to less than 10% and inaccuracy in coincidence of the zero air flow directions is smaller than 2°.

5. The wing according to claim 1, wherein the winglets (2) are staggered from a front top to a rear bottom relative to the air flow direction.

6. The wing according to claim 1, wherein the chords (c) of all winglets (2) are of equal length and parallel to one another and wherein the wing grid comprises a regular grid spacing (t) and a regular stagger angle (ω).

7. The wing according to claim 1, wherein the chords (c) of all winglets (2) are of equal length and parallel to one another, and wherein the wing grid comprises a regular grid spacing (t) and the winglets (2) comprise stagger angles (ω) increasing from the rear to the front.

8. The wing according to claim 1, wherein the chords (c) of all winglets (2) are of equal length, the winglets (2) comprise angles of attack that increase from the front to the rear, and the wing grid comprises a regular grid spacing (t).

9. The wing according to claim 1, wherein for serving as an aileron, a foremost or rearmost winglet (2) of the wing grid, relative to the air flow direction, has an angle of attack that is adjustable in flight, an increased chord length ($c_Q$) and grid spacing ($t_Q$) in comparison with the other winglets of the grid and an individual stagger angle ($ω_Q$) is matched to a maximum angle of attack of said winglet.

10. The wind according to claim 1, further comprising a further plate (3) provided between the main wing part (1) and the winglets (2) of the wing grid.

11. The wing according claim 1, wherein the distal ends of the winglets (2) of the wing grid are combined with an end plate (4).

12. The wing according to claim 10, wherein at least one of the intermediate plate (3) and an end plate (4), which is combined with the distal ends of the winglets of the wing grid, comprises a leading edge (10), which runs essentially flush with nose zones (11) of profiles of the main wing part (1) and of at least a part of the winglets (2).

13. The wing according to claim 10, wherein suction extractors are provided in one of the intermediate plate (3) and an end plate (4), which is combined with the distal ends of the winglets of the wing grid, ahead of nose zones (11) of at least a part of the winglets (2).

14. The wing according to claim 2, wherein the wing grid is arranged on the main wing part (1) such that a center of lift of the wing grid is positioned on an elastic torsion axis of the main wing part (1).

15. The wing according to claim 2, wherein deviations of the ratio of the two chord lengths ($c_M$, $c_W$) from said value amounts to less than 10% and inaccuracy in coincidence of the zero air flow directions is smaller than 2°.

16. The wing according to claim 2, wherein the winglets (2) are staggered from a front top to a rear bottom relative to the air flow direction.

17. The wing according to claim 2, wherein the chords (c) of all winglets (2) are of equal length and parallel to one another and wherein the wing grid comprises a regular grid spacing (t) and a regular stagger angle (ω).

18. The wing according to claim 2, wherein the chords (c) of all winglets (2) are of equal length and parallel to one another, and wherein the wing grid comprises a regular grid spacing (t) and the winglets (2) comprise stagger angles (ω) increasing from the rear to the front.

19. The wing according to claim 2, wherein the chords (c) of all winglets (2) are of equal length, the winglets (2) comprise angles of attack that increase from the front to the rear, and the wing grid comprises a regular grid spacing (t).

20. The wing according to claim 2, wherein for serving as an aileron, a foremost or rearmost winglet (2) of the wing grid, relative to the air flow direction, has an angle of attack that is adjustable in flight, an increased chord length ($c_Q$) and grid spacing ($t_Q$) in comparison with the other winglets of the grid and an individual stagger angle ($ω_Q$) is matched to a maximum angle of attack of said winglet.

21. The wind according to claim 2, further comprising a further plate (3) provided between the main wing part (1) and the winglets (2) of the wing grid.

22. The wing according claim 2, wherein the distal ends of the winglets (2) of the wing grid are combined with an end plate (4).

23. The wing according to claim 10, wherein at least one of the intermediate plate (3) and an end plate (4), which is combined with the distal ends of the winglets of the wing grid, comprises a leading edge (10), which runs essentially flush with nose zones (11) of profiles of the main wing part (1) and of at least a part of the winglets (2).

24. The wing according to claim 10, wherein suction extractors are provided in one of the intermediate plate (3) and an end plate (4), which is combined with the distal ends of the winglets of the wing grid, ahead of nose zones (11) of at least a part of the winglets (2).

* * * * *